(12) United States Patent
Gass et al.

(10) Patent No.: US 9,404,244 B1
(45) Date of Patent: Aug. 2, 2016

(54) FLUID CONTROL APPARATUS, SYSTEMS AND METHODS

(71) Applicants: Charles Robert Gass, Imlay City, MI (US); Daniel A. Handley, Genoa City, WI (US)

(72) Inventors: Charles Robert Gass, Imlay City, MI (US); Daniel A. Handley, Genoa City, WI (US)

(73) Assignee: Joelex, Inc., Chicago, IL (US)

( * ) Notice: Subject to any disclaimer, the term of this patent is extended or adjusted under 35 U.S.C. 154(b) by 0 days.

(21) Appl. No.: 14/679,092

(22) Filed: Apr. 6, 2015

Related U.S. Application Data

(63) Continuation-in-part of application No. 14/336,470, filed on Jul. 21, 2014, which is a continuation-in-part of application No. 13/735,685, filed on Jan. 7, 2013.

(60) Provisional application No. 61/583,728, filed on Jan. 6, 2012.

(51) Int. Cl.
| | |
|---|---|
| *F16K 15/02* | (2006.01) |
| *E03C 1/10* | (2006.01) |
| *E03B 7/07* | (2006.01) |
| *G01F 1/34* | (2006.01) |
| *G01F 15/00* | (2006.01) |
| *G01M 3/00* | (2006.01) |
| *F16K 15/06* | (2006.01) |

(52) U.S. Cl.
CPC ............... *E03C 1/104* (2013.01); *E03B 7/077* (2013.01); *F16K 15/021* (2013.01); *F16K 15/026* (2013.01); *F16K 15/063* (2013.01); *G01F 1/34* (2013.01); *G01F 15/005* (2013.01); *G01M 3/00* (2013.01)

(58) Field of Classification Search
CPC ..... F16K 15/02; F16K 15/021; F16K 15/025; F16K 15/026; F16K 15/06; F16K 15/063; F16K 15/066; E03C 1/106; E03C 1/104; G01F 15/005
USPC .................................. 137/535, 540, 542, 543
See application file for complete search history.

(56) References Cited

U.S. PATENT DOCUMENTS

| | | | | |
|---|---|---|---|---|
| 2,744,727 | A * | 5/1956 | Osburn | E21B 21/10 137/454.2 |
| 5,425,397 | A * | 6/1995 | Mackal | F16K 15/063 137/540 |
| 8,230,875 | B2 * | 7/2012 | Norman | F16K 15/063 137/315.33 |

* cited by examiner

*Primary Examiner* — Kevin Lee
(74) *Attorney, Agent, or Firm* — Scherrer Patent & Trademark Law, P.C.; Stephen T. Scherrer; Monique A. Morneault

(57) ABSTRACT

Apparatuses manage the flow of fluids, such as, for example, water, through pipes. Specifically, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements and helps reduce or eliminate the failure to detect and record low fluid flow in water meters. Moreover, the apparatuses of the present invention provide backflow prevention. Systems and methods for managing fluids are further provided.

20 Claims, 3 Drawing Sheets

FLUID CONTROL APPARATUS, SYSTEMS AND METHODS

The present invention claims priority as a continuation-in-part application to U.S. patent application Ser. No. 14/336,470 entitled, "Apparatus, Systems and Methods for Managing Fluids", filed Jul. 21, 2014, which is a continuation-in-part and claims priority to U.S. patent application Ser. No. 13/735,685 entitled, "Apparatus, Systems and Methods for Managing Fluids", filed Jan. 7, 2013, which claims priority to U.S. Prov. Pat. App. No. 61/583,728, entitled, "Apparatus, Systems and Methods for Managing Fluids", filed Jan. 6, 2012, each of which is hereby incorporated by reference in its entirety.

TECHNICAL FIELD

The present invention relates to apparatuses for managing the flow of fluids, such as, for example, water, through pipes. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatuses of the present invention provide backflow prevention and helps reduce or eliminate the failure to detect and record low fluid flow in water meters. Systems and methods for managing fluids are further provided.

BACKGROUND

It is, of course, generally known to utilize pipes for transporting fluids, such as water, from one location to another. In modern times, users generally pay for the amount of water that flows into their homes or other buildings based on the volume of usage over a specific timeframe. Businesses, especially, can be saddled with high costs for water, especially when a large amount of water is necessary for industrial processes. Specifically, the more water a home or other building has flowing thereinto, the higher the cost to the user of the water.

However, water meters that measure the flow of water into a home or other building do so by reading the volume of fluid that passes through the water meter. Typically, water meters have a fan-like turbine apparatus that spins as the fluid flows therethrough. The rotation of the turbine apparatus directly correlates to the measurement of the volume of water through the water meter.

Importantly, since the water meter measures the volume of the fluid flowing therethrough, any additional component or material within the water may be falsely registered as water when, in fact, it is not. For example, entrapped gas bubbles, such as air, may accumulate within water pipes before the water reaches the water meter. The gas bubbles may artificially increase the volume flowing into the water meter, causing a false reading, since a water meter typically cannot distinguish between the volume of water and the volume of air. In other words, gas bubbles, such as air, entrapped within water flowing through pipes, typically cause a water meter to register a higher volume of water than in actuality.

A need, therefore, exists, for apparatus, systems and methods for decreasing or removing the effect of entrapped bubbles within fluid, such as water, within a pipe. Further, a need exists for apparatus, systems and methods for providing a volume of fluid through a pipe that is more closely representative of the actual volume of the fluid within the pipe.

Specifically, a need exists for apparatus, systems and methods for removing the effect of entrapped gas bubbles within a fluid as the fluid flows through a meter, so that the meter may provide a more accurate reading of the volume of fluid flowing therethrough. In addition, a need exists for apparatus, systems and methods for effectively reducing the cost of water flowing into a home or other building.

Moreover, it is also generally known that water flowing into a home or other building may have periods of backflow, which may interfere with the quality of water that may flow into the home or other building. Specifically, while water may generally move in one direction during times of normal usage, certain occurrences of backflow may cause fouled water, contaminated water, or other fluids, to backflow, thereby fouling or otherwise contaminating the pipes and/or the source of the water.

Indeed, a flood within a home caused by extreme weather or other reasons may cause fouled water to flow the opposite direction within pipes. Moreover, it is feared that terrorists may attempt to foul or otherwise contaminate fresh water by injecting or otherwise forcing an amount of a contaminated material, such as pathogenic, nuclear or other contamination, back through pipes from a water distribution node, such as a home or the like, into a water source. Backflow preventers are generally known that utilize a valve, such as a poppet or check valve to close when reverse pressure from backflow of fluids occurs. This may generally protect the pipes and/or the source of water from back flow conditions, caused by natural or unnatural conditions.

For example, U.S. Pat. Nos. 1,828,697 and 1,860,004, both to Yardley, disclose a check valve having a floating guide to allow the passage of fluids therethrough, but to prevent the backflow of fluids due to the valve body sitting on valve seat. However, neither of the Yardley patents recognizes the benefits of compressing gas within water or other fluid to provide a more accurate measurement of the flow of water therein in the manner presented herein, or providing a dual-chamber valve apparatus as disclosed in the present invention for backflow prevention.

In addition, U.S. Pat. App. Pub. No. 2012/0118406 to Edgeworth discloses apparatuses and systems to increase the efficiency of a water meter. However, Edgeworth suffers from lack of connectivity to pipes and other apparatuses, and use of an apparatus as described in Edgeworth will lead to failure of the apparatus as it is being used, as the springs are not guided to maintain their positions within the apparatus. Moreover, there is no recognition in Edgeworth to the benefits of a dual chamber apparatus.

However, although backflow preventers within pipes may be required in certain circumstances, backflow prevention is not a requirement in many homes. Thus, many homes or other buildings do not have this important safety feature.

A need, therefore, exists for improved apparatuses to increase the efficiency of water meters to read a true measurement of a flow of water therethrough. A need further exists for improved apparatuses that are resilient to failure during periods of long use, and can be relied upon.

In addition, a need exists for apparatus, systems and methods that may be utilized as a backflow prevention device within a pipe, such as within a water pipe utilized to distribute fresh and clean water to a home or other building. Moreover, a need exists for apparatus, systems and methods that encourage homeowners or other building owners to install backflow preventers within their pipes to protect their pipes and sources of water.

A need further exists for apparatus, systems and methods that provide the dual purpose of more accurately measuring the flow of water within pipes as well as providing backflow prevention in the event of backflow.

Additionally, water meters may fail to accurately detect and record the flow of water through water pipes if the water flow is too low. For example, a slow leak in a residential pipe, such as water dripping from a faucet or a small amount of water flowing through a toilet, may not be detectable by a residential water meter. This may be caused by the lack of sensitivity of the water meter, the wear from use and build-up of deposits within the water meter. For this reason, water flow may be inaccurately recorded, leading to losses of revenue for municipalities and other water providers. Under-registration of low flow rates is the main reason for apparent water losses and it is estimated that under-registration of low flow rates can account for 5%-10% of the total water sold to users by the water utility. For old water meters, where the measuring starting point is higher and for houses with water storage tanks, apparent water losses can be more than 10%.

Thus, a need exists for apparatus, systems and methods for providing a true and accurate accounting of water flow during low flow conditions. Specifically, a need exists for apparatus, systems and methods for eliminating under-registration of low flow rates at water meters.

SUMMARY OF THE INVENTION

The present invention relates to an apparatus for managing the flow of fluids, such as, for example, water, through pipes. Specifically and without being bound by theory, the apparatus of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatus of the present invention provides backflow prevention and helps reduce or eliminate the failure to detect and record low fluid flow in water meters. Systems and methods for managing fluids are further provided.

To this end, in an embodiment of the present invention, an apparatus for managing the flow of fluid through a pipe is provided. The apparatus comprises a housing forming an internal chamber having an inlet opening and an outlet opening wherein pressurized fluid flows through the housing; a poppet valve mounted to a shaft and disposed within the internal chamber, the poppet valve able to contact a seat in proximity to the inlet opening wherein contacting the seat seals the chamber and prevents the flow of fluid through the housing; a base in proximity to the outlet opening, the base having a central opening slidably receiving the shaft, an internal surface, and at least one aperture for allowing the flow of fluid therethrough, wherein the at least one aperture is tapered; a spring around the shaft having a first end and a second end, the first end of the spring disposed within a first depression in the poppet valve and the second end of the spring disposed within a second depression in the internal surface of the base, wherein movement of the poppet valve toward the base causes a compression of the spring, wherein the housing has a first end, a second end, an internal surface having a contour, and an imaginary line dividing the housing into first and second portions, wherein the contour of the internal surface in the first portion is symmetrical with the contour of the internal surface in the second portion.

In an embodiment, the at least one aperture in the base plate has an inlet side into which the fluid flows and an outlet side out of which the fluid flows as the fluid flows therethrough, wherein the inlet side has a frusto-conical taper from the inlet side of the aperture to a midpoint between the inlet side and the outlet side, and further wherein the outlet side has a frusto-conical taper from the midpoint to the outlet side of the aperture.

In an embodiment, the frusto-conical taper from the inlet side to the midpoint is angled at 22 degrees and the frusto-conical taper from the midpoint to the outlet side of the aperture is angled at 14 degrees.

In an embodiment, the first depression in the poppet valve and the second depression in the base hold the spring in alignment around the shaft.

In an embodiment, the apparatus further comprises a flange on the first end of the housing and a threaded portion on the second end of the housing.

In an embodiment, the spring is selected from the group consisting of a coil spring and a wave spring.

In an embodiment, the contour of the internal surface in the first portion of the housing has a first region that is shaped to receive and hold the base or the seat, and the contour of the internal surface of the second portion of the housing has a second region that is shaped to receive and hold the base or the seat, wherein the base and the seat have the same external shape to fit within either the first region or the second region.

In an embodiment, the housing is made of metal.

In an embodiment, the housing is sized and shaped to receive and hold the seat at the first end of the housing and the base at the second end of the housing in a first configuration, and further wherein the housing is sized and shaped to receive and hold the base at the first end of the housing and the seat at the second end of the housing in a second configuration.

In an embodiment, the housing further comprises a first retaining clip ring recess at the first end of the housing for holding either the seat or the base at the first end of the housing, and a second retaining clip ring recess at the second end of the housing for holding either the seat or the base at the second end of the housing.

In an alternate embodiment of the present invention, a method of controlling the flow of fluid in a water distribution system is provided. The method comprises the steps of: providing an apparatus comprising a housing forming an internal chamber having an inlet opening and an outlet opening wherein pressurized fluid flows through the housing; a poppet valve mounted to a shaft and disposed within the internal chamber, the poppet valve able to contact a seat in proximity to the inlet opening wherein contacting the seat seals the chamber and prevents the flow of fluid through the housing; a base in proximity to the outlet opening, the base having a central opening slidably receiving the shaft, an internal surface, and at least one aperture for allowing the flow of fluid therethrough, wherein the at least one aperture is tapered; a spring around the shaft having a first end and a second end, the first end of the spring disposed within a first depression in the poppet valve and the second end of the spring disposed within a second depression in the internal surface of the base, wherein movement of the poppet valve toward the base causes a compression of the spring, wherein the housing has a first end, a second end, an internal surface having a contour, and an imaginary line dividing the housing into first and second portions, wherein the contour of the internal surface in the first portion is symmetrical with the contour of the internal surface in the second portion; providing a pipe in the water distribution system attached to a water meter; and disposing the apparatus in line with the pipe, such that when there is a slow leak of water through the pipe that is not detectable by the water meter, the apparatus prevents flow of water through the pipe until the water pressure downstream from the apparatus is a predefined threshold water pressure less than the water pressure upstream from the apparatus, and further wherein when the water pressure downstream from the apparatus is the predefined threshold water pressure less than the water pressure upstream from the apparatus, the apparatus allows water to flow through the water meter for detection by the water meter.

In an embodiment, the method further comprises the step of: opening the poppet valve in the apparatus when the water pressure downstream from the apparatus is less than the water pressure upstream from the apparatus, wherein the lower water pressure downstream from the apparatus is caused by a slow water flow that would be undetectable by the water meter.

In an embodiment, the method further comprises the step of opening the poppet valve in the apparatus when the water pressure downstream from the apparatus reaches a predefined threshold water pressure compared to the water pressure upstream from the apparatus, wherein the lower water pressure downstream from the apparatus is caused by a slow water flow that would undetectable by the water meter.

In an embodiment, the at least one aperture in the base plate has an inlet side into which the fluid flows and an outlet side out of which the fluid flows as the fluid flows therethrough, wherein the inlet side has a frusto-conical taper from the inlet side of the aperture to a midpoint between the inlet side and the outlet side, and further wherein the outlet side has a frusto-conical taper from the midpoint to the outlet side of the aperture.

In an embodiment, the frusto-conical taper from the inlet side to the midpoint is angled at 22 degrees and the frusto-conical taper from the midpoint to the outlet side of the aperture is angled at 14 degrees.

In an embodiment, the first depression in the poppet valve and the second depression in the base hold the spring in alignment around the shaft.

In an embodiment, the housing comprises a flange on the first end of the housing and a threaded portion on the second end of the housing.

In an embodiment, the contour of the internal surface in the first portion of the housing has a first region that is shaped to receive and hold the base or the seat, and the contour of the internal surface of the second portion of the housing has a second region that is shaped to receive and hold the base or the seat, wherein the base and the seat have the same external shape to fit within either the first region or the second region.

In an embodiment, the housing is made of metal.

In an embodiment, the housing is sized and shaped to receive and hold the seat at the first end of the housing and the base at the second end of the housing in a first configuration, and further wherein the housing is sized and shaped to receive and hold the base at the first end of the housing and the seat at the second end of the housing in a second configuration.

It is, therefore, an objective and advantage of the present invention to provide improved apparatuses, systems and methods to increase the efficiency of water meters to read a true measurement of a flow of water therethrough.

It is an a further objective and advantage of the present invention to provide improved apparatuses, systems and methods that are resilient to failure during periods of long use, and can be relied upon.

It is also an objective and advantage of the present invention to provide apparatuses, systems and methods for decreasing or removing the effect of entrapped bubbles within fluid, such as water, within a pipe.

Further, it is an objective and advantage of the present invention to provide apparatuses, systems and methods for providing a volume of fluid through a pipe that is more closely representative of the actual volume of the fluid within the pipe.

Specifically, it is an objective and advantage of the present invention to provide apparatuses, systems and methods for removing the effect of entrapped gas bubbles within a fluid as the fluid flows through a meter, so that the meter may provide a more accurate reading of the volume of fluid flowing therethrough.

In addition, it is an advantage and objective of the present invention to provide apparatuses, systems and methods for effectively reducing the cost of water flowing into a home or other building.

Moreover, it is an objective and advantage of the present invention to provide apparatuses, systems and methods that may be utilized as a backflow prevention device within a pipe, such as within a water pipe utilized to distribute fresh and clean water to a home or other building.

Moreover, it is an advantage and objective to provide apparatus, systems and methods that encourage homeowners or other building owners to install backflow preventers within their pipes to protect their pipes and sources of water.

It is a further advantage and objective of the present invention to provide apparatuses, systems and methods that provide the dual purpose of more accurately measuring the flow of water within pipes as well as providing backflow prevention in the event of backflow.

In addition, it is an advantage and objective of the present invention to provide apparatuses, systems and methods for providing a true and accurate accounting of water flow during low flow conditions.

Specifically, it is an advantage and objective of the present invention to provide apparatuses, systems and methods for eliminating under-registration of low flow rates at water meters.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an apparatus for managing the flow of fluids, such as, for example, water, through pipes. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatus of the present invention provides backflow prevention and helps reduce or eliminate the failure to detect and record low fluid flow in water meters. Systems and methods for managing fluids are further provided.

Figure 1:
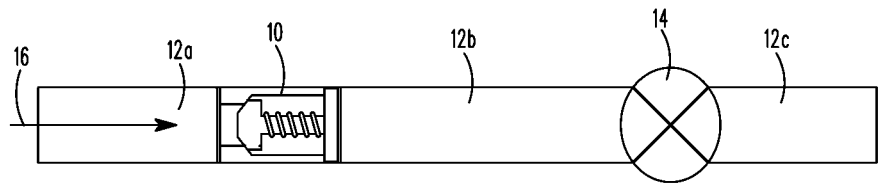
FIG. 1 illustrates a water distribution system of the present invention comprising a fluid control apparatus in an embodiment of the present invention.

Referring now to the figures, wherein like numerals refer to like parts, FIG. 1 illustrates a representation of an apparatus 10 in an embodiment of the present invention. The apparatus 10 may be disposed in-line with a pipe, represented by pipe sections 12a, 12b, 12c that may provide a flow of a fluid therethrough. The fluid may flow, generally, from left to right in FIG. 1, as represented by the arrow 16. In a preferred embodiment, the fluid may be water, and the pipe sections 12a, 12b, 12c may be parts of a water distribution pipe allowing the flow of fresh and clean water into a home or another building, as apparent to one of ordinary skill in the art. For purposes of the present invention, the fluid will be described as being water. It should be noted, however, that the apparatus 10 of the present invention may be utilized for impacting the flow of other fluids and should not be limited as described herein. The apparatus 10 is illustrated as being upstream from a water meter 14, and may preferably be disposed on the municipal side of the water meter. Although the apparatus 10 is illustrated as being upstream from the water meter, it should be understood that for purposes of the present invention, the apparatus 10 may be disposed upstream or downstream of the water meter 14 and still provide the functionality and benefits as described herein.

Also in-line with the pipe may be the water meter 14 for measuring the volume of water flowing therethrough. Thus, given a certain period of time, a total volume of water may be determined based on the rate of flow of water volume through the water meter 14. The water meter 14 may be any water meter apparent to one of ordinary skill in the art, and the specific type of water meter is unimportant for purposes of the present invention.

It is typical for water flowing within pipes, especially from a source, to contain an amount of air bubbles or other gas entrapped within the water. Gas bubbles within the water flowing through the water meter 14 may cause a falsely higher measurement of water volume flowing therethrough, leading to an inaccurate report. An inaccurate report of the volume of water flowing through the water meter 14 may cause an artificially increased cost of water consumption.

While not being bound by theory, water flowing through the pipe of the present invention may be compressed by having an amount of backward pressure induced on the fluid by the apparatus 10. Specifically, the valve contained within the apparatus 10, as shown in more detail below with respect to FIG. 2, may induce a back pressure on the water upstream from the apparatus 10, thereby compressing the air bubbles in the water upstream from the apparatus 10. The compression of the water compresses the air bubbles within the water to take up a small volume of space in the vicinity immediately upstream from the apparatus 10. Specifically, the compression of the air bubbles may be maintained for approximately five to ten feet upstream from the apparatus 10. Thus, positioning the apparatus downstream but within proximity of the water meter 14 may allow the water meter to measure a truer and more accurate volume of water flowing within the pipe. Thus, it is preferred that the apparatus 10 of the present invention be positioned within three to ten feet downstream of the water meter 14, more preferably four feet to seven feet downstream of the water meter 14 for purposes of providing compression of the air bubbles, although the present invention should not be limited as described herein. However, as noted above, the apparatus 10 may be positioned upstream from the water meter 14, as water flowing through the water meter 14 may also benefit from the above-described compression caused by the apparatus 10.

In operation, a poppet valve (detailed below) within apparatus 10 oscillates as pressure builds within the pipe 12b, caused by the apparatus 10 pushing back against the flow of water therethrough. The oscillation of the poppet valve causes the compression of gas within the fluid upstream of the apparatus 10, causing a truer reading of the fluid flow through the water mater 14.

In addition, water flow may be under-reported due to low-flow conditions, such as slow leaks, water drips, or other low flow conditions within a water distribution system. The water meter 14 may fail to record low water flow through a water distribution system due to lack of sensitivity, usage wear, build-up of deposits on the internal components of the water meter 14, or for other reasons. An inaccurate report of the volume of water flowing through the water meter 14 due to unreported or under-reported usage may cause an artificially decreased cost of water consumption.

The apparatus 10 of the present invention may further be utilized to aid in the recording and reporting of water that would otherwise be undetected due to low flow. The apparatus 10 may prevent the flow of water into a water distribution system, such as in a residential home, for example, until the pressure of water on the leading side (downstream) of the apparatus 10 drops below a threshold level, allowing the apparatus 10 to allow the flow of relatively large volumes of water when needed. Thus, a slow leak, a faucet drip, or other low flow condition may reduce the pressure upstream of the apparatus 10 until it reaches a pre-defined threshold amount, and the back pressure behind the apparatus 10 may therefore cause the apparatus 10 to open, providing batch water flow through the water meter 14. The apparatus 10 may be placed ahead of (downstream of) or behind (upstream of) the water meter 14 in such use thereof.

Figure 2:
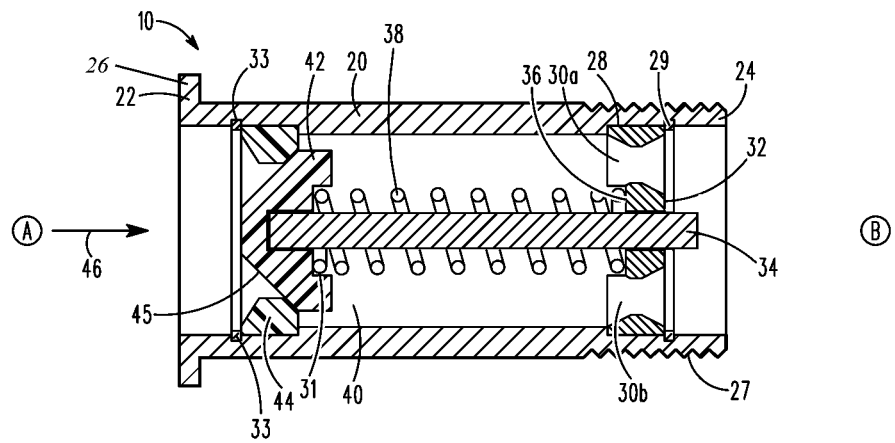
FIG. 2 illustrates a cross-sectional view of a fluid control apparatus in an embodiment of the present invention.

FIG. 2 illustrates a perspective view of the apparatus 10 in an embodiment of the present invention. The apparatus 10 may include a cylinder body portion 20, having a first end 22 and a second end 24 through which water flows therethrough. On the first end 22 may be a pipe fitting mounting flange 26, allowing the apparatus 10 to be fit onto a pipe. In other embodiments, the pipe fitting mounting plate may not be present and the apparatus 10 may simply be directly fit onto threads of a pipe. On the second end 24 of the apparatus 10 may be threads 27 for attaching to a pipe fitting, as known to one of ordinary skill in the art. Thus, the apparatus 10 may be attached to a water distribution pipe via the mounting flange 26 and the threads 27 on the first and second ends 22, 24, respectively.

Preferably, the cylinder body portion 20 may be a standard housing that one may purchase for purposes of coupling water distribution pipes, and may be made from any material useful herein, such as, for example, metal such as brass or stainless, steel, thermoplastic, such as Delrin® from DuPont Chemical Co. For example, the apparatus 10 of the present invention may utilize a water meter coupling, such as the 433LF Water Meter Coupling, a lead-free brass water meter coupling from Matco-Norca. The housing may thus be a standard, off-the-shelf coupling that may be retrofitted to house the various components of the present invention, as described herein.

Within the second end 24 of the apparatus 10 may be a base plate 28 that may be rigidly held in place via retaining clip ring 29, having a plurality of apertures 30a, 30b disposed therein to allow water to freely flow through the apertures 30a, 30b. The base plate 28 may include an aperture 32 at the center of the base plate 28 to allow the movement of a shaft 34 therethrough. The shaft 34 may be connected to a poppet valve 42, as described below, and may move freely through the aperture 32 within the base plate 28.

The base plate 28 may further have an internal spring guide 36 on an internal surface of the base plate 28 that allows a spring 38 to maintain its position within an internal chamber 40 of the cylinder body portion 20. The internal spring guide 36 may be a depression or cut-out portion within the surface of the base plate 28 that seats the end of the spring 38 therein, reducing or eliminating movement of the sprint 38. The spring 38 may thus contact, at one end thereof, the base plate 28, maintaining its position within the chamber 40 via the spring guide 36.

Moreover, the spring 38 may contact, at a second end thereof, an internal surface of a poppet valve 42, thereby biasing the poppet valve 42 into a seat surface 44 formed in a seat 43. The spring 38 may sit within a seat spring guide 31, which may be a depression or cut-out disposed in the seat 43 for holding the spring 38 and prevent movement of the same while in use. The shaft 34 may be rigidly attached to the poppet valve 42, providing a linear path of movement of the poppet valve 42 against and away from the seat surface 44 of the seat 43. Preferably, the poppet valve 42 is frusto-conically shaped and may sit on the seat 43 that may also have a mating frusto-conical shape to receive the same.

The seat 43 may be held in place via a retaining clip ring 33 to prevent movement of the seat 43 within the apparatus 10. Preferably, the seat 43 is a separate element that may be inserted into the apparatus 10 and held by the retaining clip ring 33.

In operation, water or another fluid, represented by arrow 46 in FIG. 2, from upstream side A of the apparatus 10 may push against the external surface 45 of poppet valve 42 against the tension of the spring 38, which is biasing the poppet valve 42 in the opposite direction. In one embodiment of the present invention, the resistance of the poppet valve 42, caused by the spring 38 compresses the water and, more importantly, any gases within the water, thereby decreasing the volume of the same. In an alternate embodiment thereof, resistance of the poppet valve, caused by the spring 38, reduces flow of the water through the apparatus 10 until pressure sufficiently drops on the downstream side B allowing the poppet valve 42 to open, allowing water to flow therethrough. When the downstream pressure of the water within the system reaches a certain predefined threshold, the upstream pressure opens the poppet valve 42 allowing the water to push through the apparatus 10 and out the apertures 30a, 30b within the base 28. The compressibility of the spring 38 may be adjusted to set the threshold of which the poppet valve 42 may open when the water pressure differential reaches a certain predefined level.

However, opening the poppet valve 42 may cause the pressure differential to drop, causing the poppet valve 42 to close again on the seat surface 44. This pressurization/depressurization may occur sporadically under low water flow conditions, causing a batch flow of water through the water meter 14, allowing the water meter 14 to detect and record the water flow. Thus, when the pressure differential reaches the predefined threshold, the poppet valve 42 may open for a period of time allowing a relatively large amount of water to flow through the meter. Thus, low flow water conditions may cause the batch flow of water through the meter, allowing detection and measurement of the same.

Therefore, it is necessary that the spring 38 have a compressibility to allow the opening of the poppet valve 42 when the downstream pressure falls to a certain threshold value. If the tension of the spring 38 is too low, the poppet valve 42 may open too easily, not providing sufficient water flow through the water meter 14 to detect and record the same. Likewise, if the tension of the spring 38 is too high, then the poppet valve 42 may not open effectively, restricting the flow of water therethrough, preventing the flow of water when needed during normal usage thereof.

Preferably, the apparatus 10 may be made of any material having sufficient resiliency to withstand the pressure differentials, and to operate as disclosed herein. Preferably, the body portion 20, including flange 26 on the first end 22 and the threads 29 on the second end 24 may be made of a metal, such as, preferably, brass. The internal components disposed within the body portion 20 may be plastic, metal, or other material that is resilient to wear and useful as disclosed herein. Specifically, the retaining clip rings 29, 33 may be metal to provide sufficient strength to hold the base plate 28 and the seat 43 in place, respectively. The base plate 43 may preferably be made of metal, such as stainless steel to prevent wear and provide strength. The shaft 34 and the spring 38 may likewise be metal, such as stainless steel. The poppet valve 42 and the seat 43, however, may be a thermoplastic, such as a wear-resistant thermoplastic, preferably a thermoplastic polymer such as Delrin® by DuPont®, which has high stiffness, tensile strength, and good mating with metals.

Figure 3:
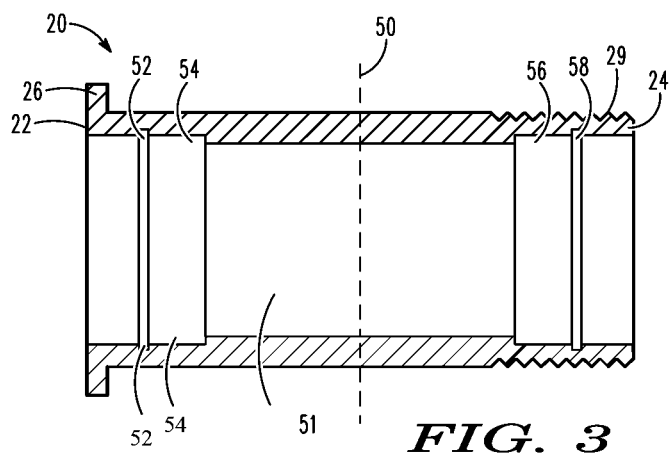
FIG. 3 illustrates a cross-sectional view of a housing for a fluid control apparatus in an embodiment of the present invention.

Referring now to FIG. 3, the body portion 20 of the apparatus 10 is illustrated. Specifically, the body portion 20 comprises the first end 22, having the flange 26, and the second end 24, having the threads 29, as described above with reference to FIG. 2. However, the body portion 20, illustrated in FIG. 3, illustrates the apparatus 10 without any internal components so that the contour of the internal surface of the body portion 20 may be readily seen.

The internal surface of the body portion 20 may preferably have a symmetrical shape on either side of imaginary plane 50 that is disposed perpendicular to a length of the housing. Thus, contours on the internal surface of the body portion 20 on one side of the plane 50 may be mirrored on the internal surface of the body portion 20 on the other side of the plane 50. Specifically, the body portion 20 may comprise an internal space 51. Near first end 22 may be a first retaining clip ring bore-out 52 within the internal surface of the body portion 20 that may alternately hold retaining clip ring 33 (as illustrated in FIG. 2) or retaining clip ring 29, in an alternate embodiment of the present invention, illustrated in FIG. 4. Mirrored near the second end 24 may be a second retaining clip ring bore-out 58 within the internal surface of the body portion 20 that may alternately hold retaining clip ring 29 (as illustrated in FIG. 2) or retaining clip ring 33, in an alternate embodiment of the present invention, illustrated in FIG. 4. Retaining clip ring 29 and retaining clip ring 33 may, thus, have the same or similar shape or dimensions to fit alternately in either first or second retaining clip ring bore-out 52, 58.

Figure 4:
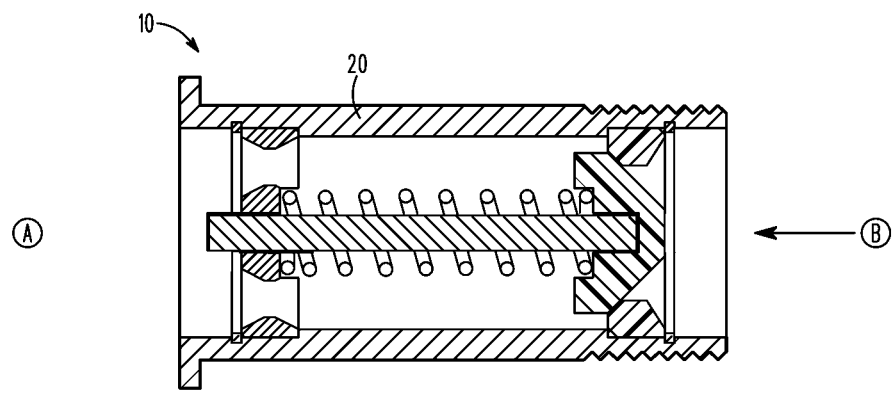
FIG. 4 illustrates a cross-sectional view of a fluid control apparatus in a reverse configuration in an embodiment of the present invention.

In addition, near the first end 22 of the body portion 20 may be a first seat or base plate bore-out 54 that may alternately hold seat 43 (as illustrated in FIG. 2) or base plate 28, as shown in an alternate embodiment of the present invention, illustrated in FIG. 4. Likewise, mirrored near the second end 24 may be a second seat or base plate bore-out 56 that may alternately hold base plate 28 (as illustrated in FIG. 2) or seat 43, as shown in an alternate embodiment of the present invention, illustrated in FIG. 4. Therefore, the seat 43 and the base plate 28 may have the same or similar dimensions to alternately fit into first or second seat or base plate bore-out 54, 56, respectively.

It should be noted that the bore-outs to hold the various components within the housing are defined as being "near" the first and second ends of the housing, the location of the bore-outs may be in any location within the housing, even relatively closer to the center of the housing than the ends of the housing. Likewise, while the internal surface of the housing may be symmetrical about imaginary line 50, it may be that the line of symmetry may not be disposed in the precise center of the housing, but offset on either side toward the first or second ends.

Thus, the internal components of the apparatus 10 may be disposed either in a first configuration, where the water flows from A to B, as illustrated in FIG. 2, or in a second reversed configuration, where the water flows from B to A, as illustrated in FIG. 4. Because of the symmetry of the internal surface of the body portion 20, the internal components described herein may be configured in either of the two configurations described herein and shown in FIGS. 2 and 4, as needed. Therefore, the present invention may be reversible, and may present a heightened freedom to use the invention as needed in various applications.

Figure 5:
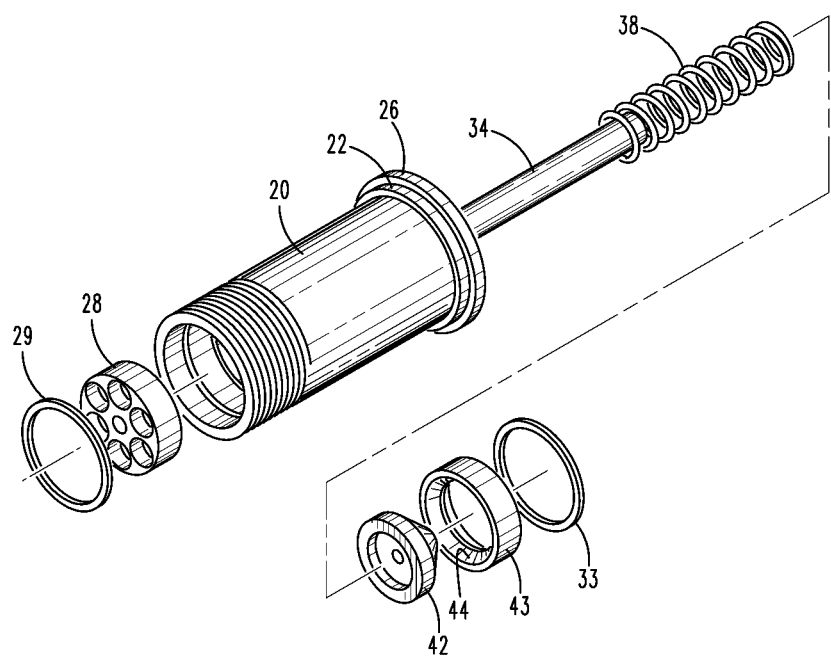
FIG. 5 illustrates an exploded view of a fluid control apparatus in an embodiment of the present invention.

FIG. 5 illustrates an exploded view of the apparatus 10, as shown and described above with reference to FIG. 2. As illustrated, the body portion 20 may have the flange 26 on the first end 22 and the threads 29 on the second end 24. Further, the body portion may contain the retaining clip ring 29 that may hold the base plate 28 within the body portion 20. Further, the body portion 20 may comprise the shaft 34, the spring 38, the poppet valve 42, the seat 43 having the seat surface 44, and the second retaining clip ring 33.

Figure 6:
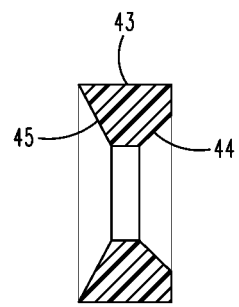
FIG. 6 illustrates a cross-sectional view of a poppet seat in an embodiment of the present invention.

FIG. 6 illustrates a close-up cross-sectional view of the seat 43, as disclosed above. The seat 43 may be cylindrically-shaped, as shown in FIG. 5, having may comprise the seat surface 44, for contact with the poppet valve 42, and an outer surface 45. When the poppet valve 42 is displaced from the seat surface 43, water may flow therethrough over surfaces 44, 45 and into the apparatus 10, as described above.

To better facilitate the flow of water over surfaces 44, 45 and through the seat 43, the seat surface 44 and the outer surface 45 may be angled to minimize turbulence of the water flow therethrough. In a preferred embodiment, the angle of the outer surface, to horizontal, is greater than the seat surface, to horizontal. Most preferred, the angle of the outer surface 45 to the horizontal line 60, as shown in FIG. 6, is about 60 degrees, and the angle of the seat surface 44 to the horizontal line 60 is about 45 degrees.

Figure 7:
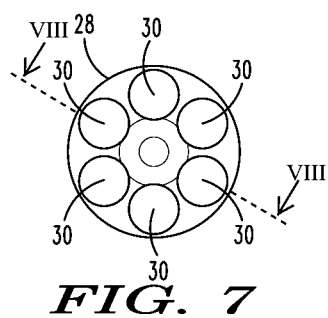
FIG. 7 illustrates a front view of a base plate for a fluid control apparatus in an embodiment of the present invention.
Figure 8:
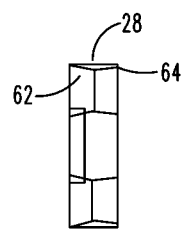
FIG. 8 illustrates a cross-sectional view of a base plate for a fluid control apparatus in an embodiment of the present invention.

Additionally shown in FIGS. 7 and 8, the base plate 28 is illustrated in close-up. The base plate 28 may have a plurality of apertures 30. The plurality of apertures 30 may allow fluid, such as water, to flow therethrough when the poppet valve 42 is open. Preferably, there may be six apertures 30 arranged circularly within the base pate 28. Of course, any number of apertures may be disposed with the base plate 28 such that fluid may flow therethrough. As a result of fluid flowing through the plurality of apertures 30, turbulence may be created as the fluid adjusts from one volume to another. As a result of this turbulence, the flow of the fluid through the base plate 28 may be negatively impacted.

The plurality of apertures 30 may be tapered accordingly to control the flow of fluid through the base plate 28. Specifically, the plurality of apertures 30 may each have a funneled inlet 62 and a funneled outlet 64. Specifically, as shown in FIG. 8, the funneled inlet 62 preferably may be angled at 22 degrees with respect to walls on opposite sides of the funneled inlet, or 11 degrees from the horizontal. The funneled outlet 64 preferably may be angled at 14 degrees with respect to walls on opposite sides of the funneled outlet, or 7 degrees from the horizontal. Of course, other angles may be used without departing from the scope of the present invention.

The funneled inlet 62 may draw fluid inwardly and increase the speed of the fluid as the volume is constricted. The funneled outlet 64 may expel fluid outwardly and decrease the speed of the fluid as the volume expands. The change in the speed and volume of the fluid through the funneled inlet 62 and funneled outlet 64 may create a Venturi effect, wherein fluid pressure may be reduced through the plurality of apertures 30 in the base plate 28. Funneling the inlet and outlet may reduce the amount of turbulence the fluid would experience when flowing through the plurality of apertures 30.

It should be noted that the embodiments described herein may be configured in a dual valve system, wherein a first apparatus, as described above, and a second apparatus, as described above, may be attached, connected, or otherwise disposed together serially, as disclosed in U.S. patent application Ser. Nos. 14/336,470 and 13/735,685, each of which are incorporated herein by reference in their entireties.

It should further be noted that various changes and modifications to the presently preferred embodiments described herein will be apparent to those skilled in the art. Such changes and modifications may be made without departing from the spirit and scope of the present invention and without diminishing its attendant advantages.

We claim:

1. An apparatus for managing the flow of fluid through a pipe comprising:

a housing forming an internal chamber having a first end and a second end, and further having an inlet opening at the first end and an outlet opening at the second end, and an internal surface between the first end and the second end, wherein pressurized fluid flows through the housing;

a poppet valve seat removably engaged to the internal surface of the housing;

a poppet valve mounted to a shaft and disposed within the internal chamber, the poppet valve configured to contact the seat in proximity to the inlet opening wherein contacting the seat seals the chamber and prevents the flow of fluid through the housing;

a base in proximity to the outlet opening removably engaged to the internal surface of the housing, the base having a central opening slidably receiving the shaft, an internal surface, and at least one aperture for allowing the flow of fluid therethrough, wherein the at least one aperture is tapered;

a spring around the shaft having a first end and a second end, the first end of the spring disposed within a first depression in the poppet valve and the second end of the spring disposed within a second depression in the internal surface of the base, wherein movement of the poppet valve toward the base causes a compression of the spring, wherein the housing has a length between the first end and a second end, and an imaginary plane disposed perpendicular to the length of the housing dividing the housing into first and second portions, wherein the contour of the internal surface in the first portion and the contour of the internal surface in the second portion are mirrored with respect to each other.

2. The apparatus of claim 1 wherein the at least one aperture in the base plate has an inlet side into which the fluid flows and an outlet side out of which the fluid flows as the fluid flows therethrough, wherein the inlet side has a frusto-conical taper from the inlet side of the aperture to a midpoint between the inlet side and the outlet side, and further wherein the outlet side has a frusto-conical taper from the midpoint to the outlet side of the aperture.

3. The apparatus of claim 2 wherein the frusto-conical taper from the inlet side to the midpoint is angled at 22 degrees and the frusto-conical taper from the midpoint to the outlet side of the aperture is angled at 14 degrees.

4. The apparatus of claim 1 wherein the first depression in the poppet valve and the second depression in the base hold the spring in alignment around the shaft.

5. The apparatus of claim 1 further comprising:
a flange on the first end of the housing and a threaded portion on the second end of the housing.

6. The apparatus of claim 1 wherein the spring is selected from the group consisting of a coil spring and a wave spring.

7. The apparatus of claim 1 wherein the contour of the internal surface in the first portion of the housing has a first region that is shaped to receive and hold the base or the seat, and the contour of the internal surface of the second portion of the housing has a second region that is shaped to receive and hold the base or the seat, wherein the base and the seat have the same external shape to fit within either the first region or the second region.

8. The apparatus of claim 1 wherein the housing is made of metal.

9. The apparatus of claim 5 wherein the housing is sized and shaped to receive and hold the seat at the first end of the housing and the base at the second end of the housing in a first configuration, and further wherein the housing is sized and shaped to receive and hold the base at the first end of the housing and the seat at the second end of the housing in a second configuration.

10. The apparatus of claim 9 wherein the housing further comprises a first retaining clip ring recess at the first end of the housing for holding either the seat or the base at the first end of the housing, and a second retaining clip ring recess at the second end of the housing for holding either the seat or the base at the second end of the housing.

11. A method of controlling the flow of fluid in a water distribution system comprising the steps of:
providing an apparatus comprising a housing forming an internal chamber having a first end and a second end, and further having an inlet opening at the first end and an outlet opening at the second end, and an internal surface between the first end and the second end, wherein pressurized fluid flows through the housing; a poppet valve seat removably engaged to the internal surface of the housing; a poppet valve mounted to a shaft and disposed within the internal chamber, the poppet valve configured to contact the seat in proximity to the inlet opening wherein contacting the seat seals the chamber and prevents the flow of fluid through the housing; a base in proximity to the outlet opening removably engaged to the internal surface of the housing, the base having a central opening slidably receiving the shaft, an internal surface, and at least one aperture for allowing the flow of fluid therethrough, wherein the at least one aperture is tapered; a spring around the shaft having a first end and a second end, the first end of the spring disposed within a first depression in the poppet valve and the second end of the spring disposed within a second depression in the internal surface of the base, wherein movement of the poppet valve toward the base causes a compression of the spring, wherein the housing has a length between the first end and a second end, and an imaginary plane disposed perpendicular to the length of the housing dividing the housing into first and second portions, wherein the contour of the internal surface in the first portion and the contour of the internal surface in the second portion are mirrored with respect to each other;
providing a pipe in the water distribution system attached to a water meter; and
disposing the apparatus in line with the pipe, such that when there is a slow leak of water through the pipe that is not detectable by the water meter, the apparatus prevents flow of water through the pipe until the water pressure downstream from the apparatus is a predefined threshold water pressure less than the water pressure upstream from the apparatus, and further wherein when the water pressure downstream from the apparatus is the predefined threshold water pressure less than the water pressure upstream from the apparatus, the apparatus allows water to flow through the water meter for detection by the water meter.

12. The method of claim 11 further comprising the step of:
opening the poppet valve in the apparatus when the water pressure downstream from the apparatus is less than the water pressure upstream from the apparatus, wherein the lower water pressure downstream from the apparatus is caused by a slow water flow that would be undetectable by the water meter.

13. The method of claim 11 further comprising the step of:
opening the poppet valve in the apparatus when the water pressure downstream from the apparatus reaches a predefined threshold water pressure compared to the water pressure upstream from the apparatus, wherein the lower water pressure downstream from the apparatus is caused by a slow water flow that would undetectable by the water meter.

14. The method of claim 11 wherein the at least one aperture in the base plate has an inlet side into which the fluid flows and an outlet side out of which the fluid flows as the fluid flows therethrough, wherein the inlet side has a frusto-conical taper from the inlet side of the aperture to a midpoint between the inlet side and the outlet side, and further wherein the outlet side has a frusto-conical taper from the midpoint to the outlet side of the aperture.

15. The method of claim 14 wherein the frusto-conical taper from the inlet side to the midpoint is angled at 22 degrees and the frusto-conical taper from the midpoint to the outlet side of the aperture is angled at 14 degrees.

16. The method of claim 11 wherein the first depression in the poppet valve and the second depression in the base hold the spring in alignment around the shaft.

17. The method of claim 11 wherein the housing comprises a flange on the first end of the housing and a threaded portion on the second end of the housing.

18. The method of claim 11 wherein the contour of the internal surface in the first portion of the housing has a first region that is shaped to receive and hold the base or the seat, and the contour of the internal surface of the second portion of the housing has a second region that is shaped to receive and hold the base or the seat, wherein the base and the seat have the same external shape to fit within either the first region or the second region.

19. The method of claim 11 wherein the housing is made of metal.

20. The method of claim 17 wherein the housing is sized and shaped to receive and hold the seat at the first end of the housing and the base at the second end of the housing in a first configuration, and further wherein the housing is sized and shaped to receive and hold the base at the first end of the housing and the seat at the second end of the housing in a second configuration.

* * * * *